C. M. MATTES.
FRONT DRIVE MECHANISM.
APPLICATION FILED OCT. 1, 1914.

1,163,677.

Patented Dec. 14, 1915.
2 SHEETS—SHEET 1.

WITNESSES
F. Graves
R. J. Dearborn

INVENTOR
Charles M. Mattes
BY
E. W. Marshall
ATTORNEY

C. M. MATTES.
FRONT DRIVE MECHANISM.
APPLICATION FILED OCT. 1, 1914.

1,163,677.

Patented Dec. 14, 1915.
2 SHEETS—SHEET 2.

WITNESSES
J. Graves
R. H. Fairborn

INVENTOR
Charles M. Mattes
BY
E. W. Marshall
ATTORNEY

UNITED STATES PATENT OFFICE.

CHARLES M. MATTES, OF NEW YORK, N. Y.

FRONT DRIVE MECHANISM.

1,163,677. Specification of Letters Patent. Patented Dec. 14, 1915.

Application filed October 1, 1914. Serial No. 864,391.

*To all whom it may concern:*

Be it known that I, CHARLES M. MATTES, a citizen of the United States of America, and a resident of New York, county and State of New York, have invented certain new and useful Improvements in Front Drive Mechanism, of which the following is a specification, reference being had to the accompanying drawings, forming a part thereof.

My invention relates to motor vehicles, tractors, and the like and has special reference to driving mechanisms which are adapted to be attached to vehicles in common use and coöperate with the steering wheels thereof.

One object of my invention is to provide a relatively simple and compact fifth wheel and motor driving mechanism of the character adapted to be utilized as above indicated.

It has been my aim to produce a compact two-part structure which may replace the usual fifth wheel structure of ordinary vehicles, such as a horse-drawn truck, and convert the vehicle into an automobile or motor truck with only slight changes in the vehicle involving a minimum expenditure of labor and expense.

My invention is, of course, not limited to any particular style or type of vehicle and I intend that only such limitations be imposed as are indicated in the claims appended hereto.

Other objects and advantages of my invention will be set forth hereinafter, and in order that my invention may be fully understood, I will now proceed to describe the same in the following specification and then point out the novel features thereof in appended claims.

Figure 1:
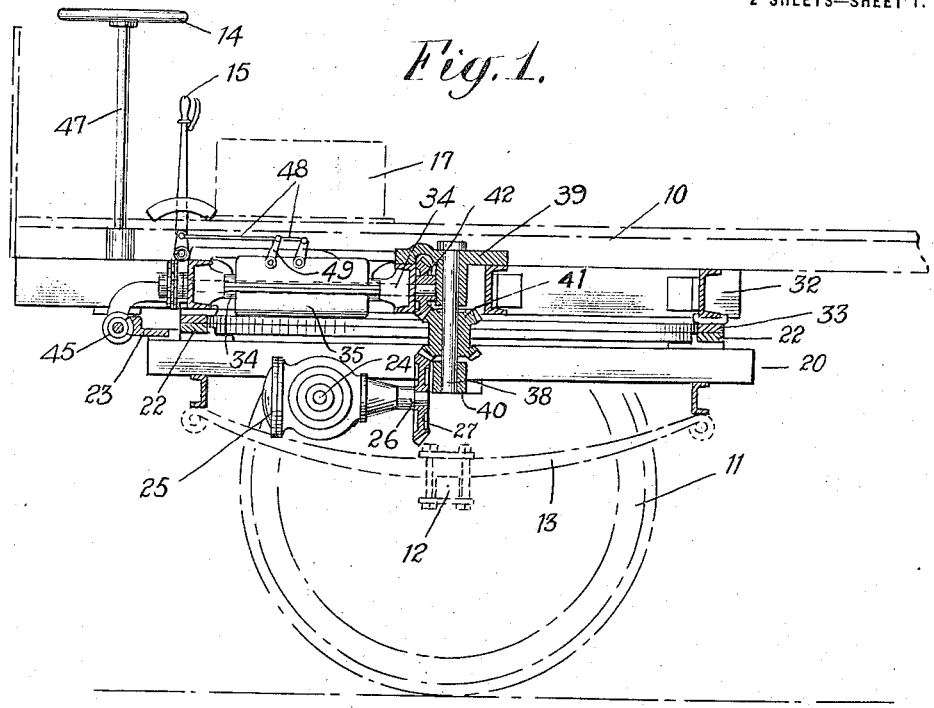
Figure 2:
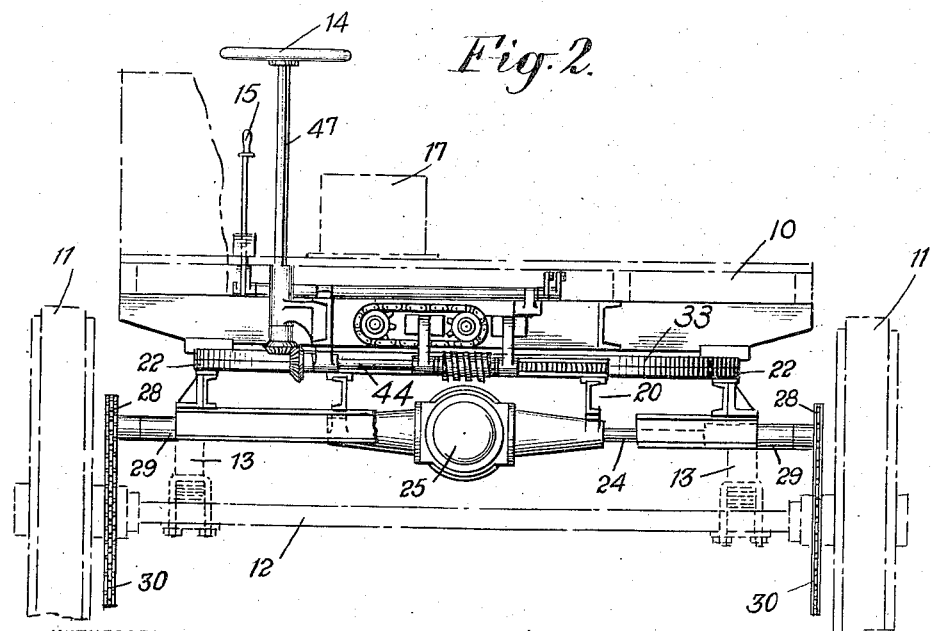
Figure 3:
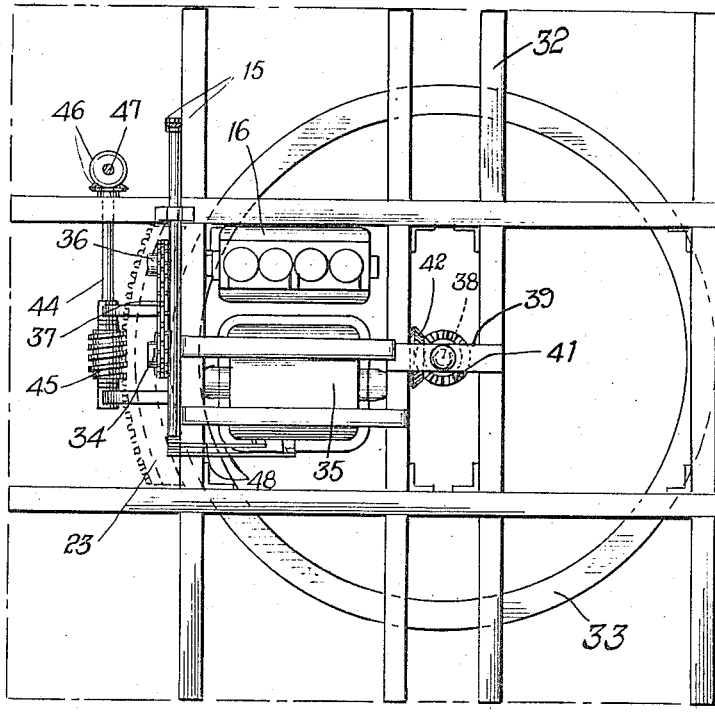
Figure 4:
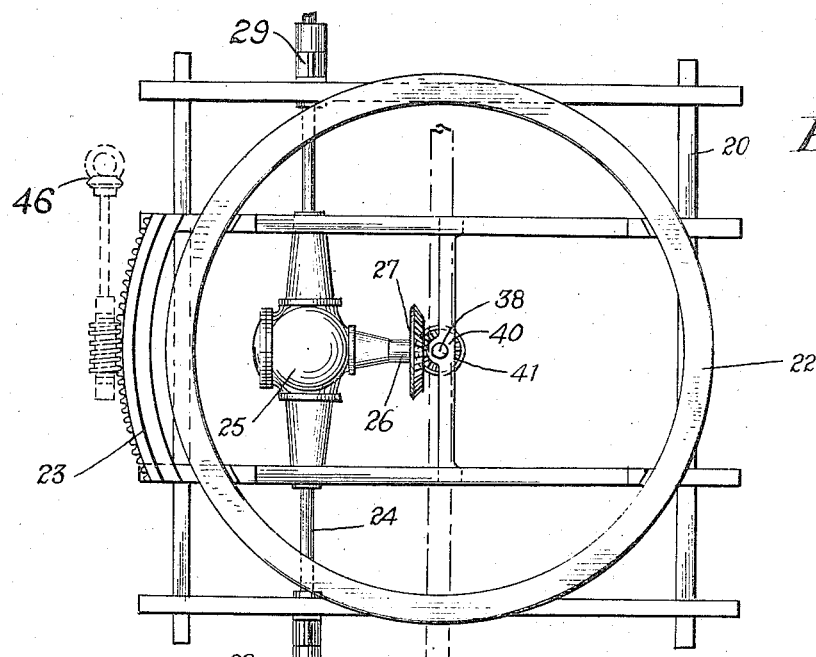

Referring to the drawings: Figure 1 is a side elevation of a fifth wheel and driving motor structure arranged and constructed in accordance with my invention, a vehicle frame and steering axle being shown in dotted lines. A front view of the same mechanism is shown in Fig. 2. Fig. 3 is a plan view of the upper section of the fifth wheel structure while a similar view of the lower section of the same structure is shown in Fig. 4.

Like characters of reference designate corresponding parts in all the figures.

10 represents a body or frame of the vehicle such as a truck to which my invention is attached, the wheels being indicated at 11, and the axle at 12. Mounted on the axle 12 are a pair of semi-elliptical springs 13 which support the lower section of the fifth wheel structure. The upper section of the same structure is secured to the under side of the vehicle frame 10, certain of the parts such as the steering wheel 14 and control levers 15 extending through the floor of the body so that they are accessible to the vehicle driver. The motor which is represented at 16 is also of such size that it extends above the floor of the body and consequently the body is preferably provided with a casing or hood 17.

The fifth wheel mechanism with which my invention is particularly concerned, will now be described more in detail.

The bottom section which is shown in plan in Fig. 4, comprises a frame 20, an annular bearing plate 22, a worm wheel segment 23, a transverse driving shaft 24, a differential 25, a horizontal shaft 26 extending at right angles to the shaft 24 and connected thereto through the differential, a beveled gear 27 on the shaft 26, and sprocket pinions 28. Although the segment 23 is shown as a comparatively short one, it may, of course, be larger, in fact it may, if desired, be a complete circular gear. The pinions 28 are located at the respective ends of the shaft 24 which is rotatably mounted in bearings 29, and are operatively connected to the wheels 11 by chains 30 which coöperate with the pinions 28 and with sprocket wheels 31 mounted on the wheel hubs.

The upper section which is shown in plan in Fig. 3 comprises a frame 32, an annular plate 33 mounted thereon, a transmission shaft 34 and a transmission indicated by casing 35, an engine shaft 36 which is operatively connected to the transmission shaft by a sprocket chain 37, and a vertical king pin 38. The king pin is mounted in a bearing 39 (see Fig. 1) and extends through a bearing 40 of the lower fifth wheel section. Rotatably mounted upon it between the bearings is a double faced bevel gear 41 the toothed faces of which coöperate respectively with a beveled gear 42 on the transmission shaft 34 and the beveled gear 27 on the differential 26, the arrangement of parts being such that the two sections of the fifth wheel structure may rotate about the axis of the king pin as a center without interrupting or interfering with the operative connection which is established, through the beveled gears 27 and 42 and the double faced gear 41, between the transmission shaft and the differential shaft. Since the differential shaft is operatively connected to the engine, the connection is obviously completed from the engine to the shaft 24 and from thence through the chains 30 to the wheels 11. The upper section of the fifth wheel structure is also provided with a steering shaft 44 which is provided with a worm 45 and is connected by beveled gears 46 with the post 47 of the steering wheel 14. The control levers 15 are connected to the transmission by links 48 and levers 49 in a well known manner.

All of the parts which have been described as a part of the upper section of the fifth wheel structure are secured to and supported by the frame 32 while all of the parts which are described as making up the lower section of the fifth wheel structure are secured to and supported by the frame 20. It is therefore evident that it is only necessary to sufficiently cut away a portion of the body of a vehicle to permit the steering wheel, control lever, and engine, to extend through the floor in order to attach the upper section of the structure to an ordinary truck body. The lower section has only to be mounted on the vehicle springs and the wheels equipped with sprockets 31.

I am aware that front wheel drives have hitherto been devised, but I believe I am the first to suggest the use of a fifth wheel structure composed of a pair of relatively simple and compact unitary sections which may be directly attached to a vehicle by making a few simple changes involving a very slight expenditure of time and expense.

What I claim is:

1. A front driving attachment for vehicles composed of a unitary upper fifth wheel section, comprising a frame adapted to be attached to the vehicle body, a driving motor, and a transmission mechanism both secured to the frame, a king pin mounted on the frame and a gear on the king pin operatively connected to the motor, a steering post mounted on the frame, a steering wheel and a steering gear operatively connected thereto; and a unitary lower fifth wheel section comprising a frame adapted to be secured to the steering truck of the vehicle, a differential shaft mounted on the frame, a driving shaft on the frame adapted to be operatively connected to the vehicle wheels, a steering segment secured to the frame adapted to coöperate with the steering gear, and means for establishing an operative connection between the differential shaft and the king pin gear when the fifth wheel sections are superposed.

2. A front driving attachment for vehicles comprising an upper fifth wheel section adapted to be attached as a unit to the vehicle body and comprising a driving motor, a king pin, a double-faced beveled gear operatively connected to the motor and coaxial with the king pin, a steering post, a steering wheel and a steering gear connected thereto; a lower fifth wheel section adapted to be attached as a unit to the steering truck of the vehicle and comprising a transverse driving shaft adapted to be operatively connected to the vehicle wheels, a longitudinal shaft having a bevel gear to coöperate with the king pin gear and operatively connected to the transverse driving shaft, and a steering segment adapted to coöperate with the steering gear when the fifth wheel sections are superposed.

In testimony whereof, I have hereunto set my hand this 30th day of September, 1914, in the presence of two subscribing witnesses.

CHARLES M. MATTES.

Witnesses:
R. J. DEARBORN,
F. GRAVES.